(12) United States Patent
Kok

(10) Patent No.: US 7,171,779 B1
(45) Date of Patent: Feb. 6, 2007

(54) TOOL TO REMOVE SOIL OBSTRUCTING THE ENTRANCES TO GOPHER AND MOLE BURROWS

(76) Inventor: Sheryl Lynn Kok, 2176 Flint Ave., Escondido, CA (US) 92027

(*) Notice: Subject to any disclaimer, the term of this patent is extended or adjusted under 35 U.S.C. 154(b) by 0 days.

(21) Appl. No.: 10/843,254

(22) Filed: May 11, 2004

Related U.S. Application Data

(60) Provisional application No. 60/473,521, filed on May 28, 2003.

(51) Int. Cl.
*A01M 17/00* (2006.01)

(52) U.S. Cl. .................................................. 43/124

(58) Field of Classification Search ............... 43/124, 43/132.1; 47/1, 5, 8, 48.5, 57.5, 52; 172/371, 172/374, 375, 378; 111/92, 900, 99, 96, 111/95
See application file for complete search history.

(56) References Cited

U.S. PATENT DOCUMENTS

| | | |
|---|---|---|
| 1,558,426 A | 10/1925 | Barnes |
| 1,572,431 A | 2/1926 | Hansen |
| 1,890,391 A * | 12/1932 | Lane ........................... 111/96 |
| 2,390,686 A * | 12/1945 | Bishop ........................ 111/95 |
| 2,427,369 A | 9/1947 | Ruple |
| 2,539,271 A | 1/1951 | Rianda |
| 2,725,662 A * | 12/1955 | Gorjup ........................ 43/124 |
| 2,776,634 A * | 1/1957 | Morton ........................ 111/92 |
| 2,809,067 A | 10/1957 | Macchi |
| 3,132,067 A | 5/1964 | Rauscher |
| 3,550,542 A * | 12/1970 | Hollis ........................ 111/95 |
| 3,722,604 A | 3/1973 | Lesher |
| 3,927,720 A | 12/1975 | Rauch |
| 4,011,612 A * | 3/1977 | Atkinson ....................... 7/116 |
| D269,844 S | 7/1983 | Hackerson |
| 4,413,440 A | 11/1983 | Schultz |
| 6,047,650 A | 4/2000 | Taddei |

FOREIGN PATENT DOCUMENTS

GB 2 199 472 A 7/1983

* cited by examiner

*Primary Examiner*—T. Nguyen
(74) *Attorney, Agent, or Firm*—Nath & Associates PLLC; Gregory B. Kang

(57) ABSTRACT

A device for locating and obtaining access to subterranean rodent burrows as an aid to the field of pest extermination. The device allows the user to probe the ground with one end of the tool in order to locate the burrow and determine depth and direction of said burrow. Once this is accomplished, the other end of the tool is used to remove soil that is obstructing access to the rodent burrow, leaving the burrow exposed and intact, allowing for the easy application of traps or rodenticides.

2 Claims, 4 Drawing Sheets

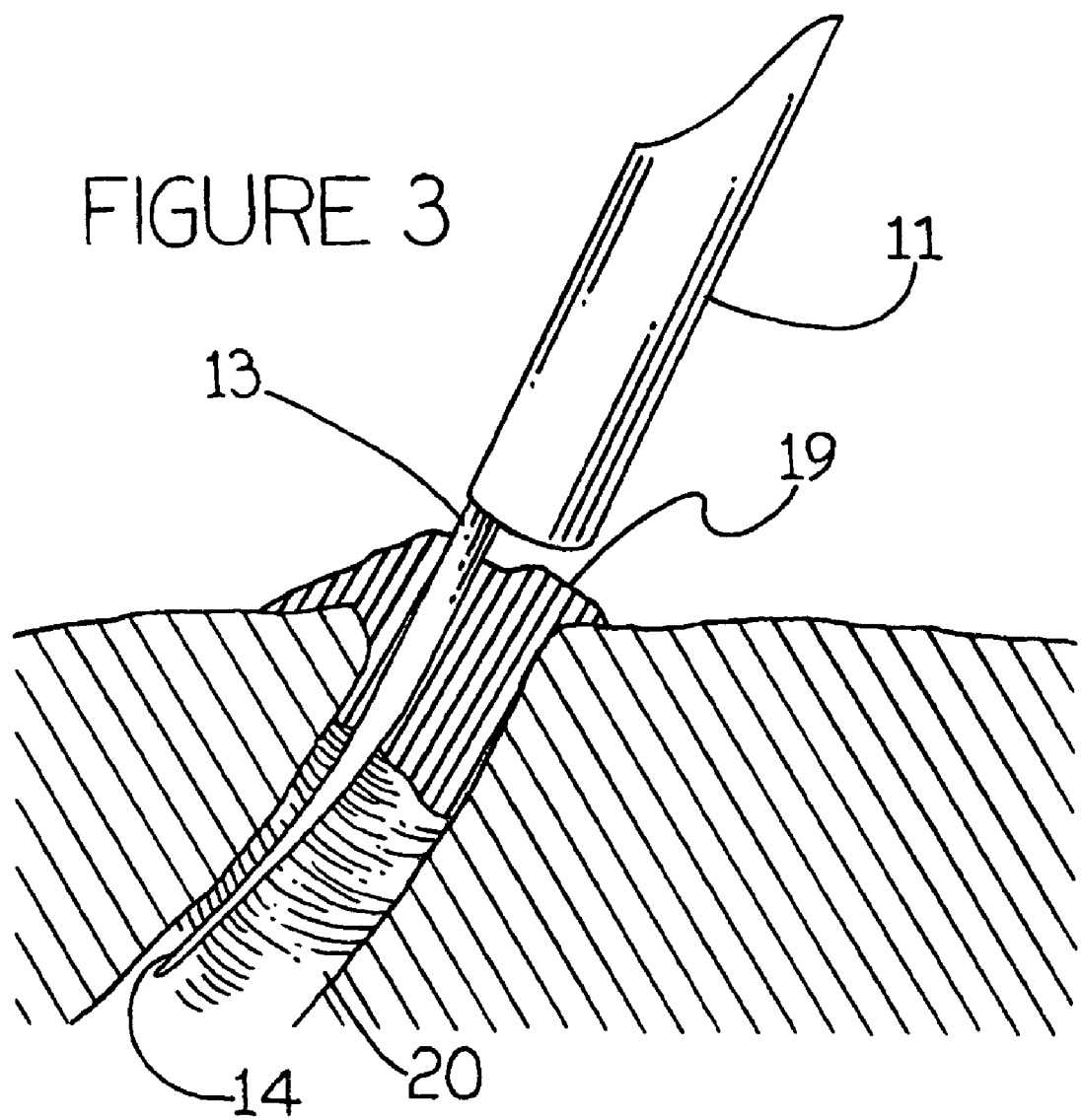

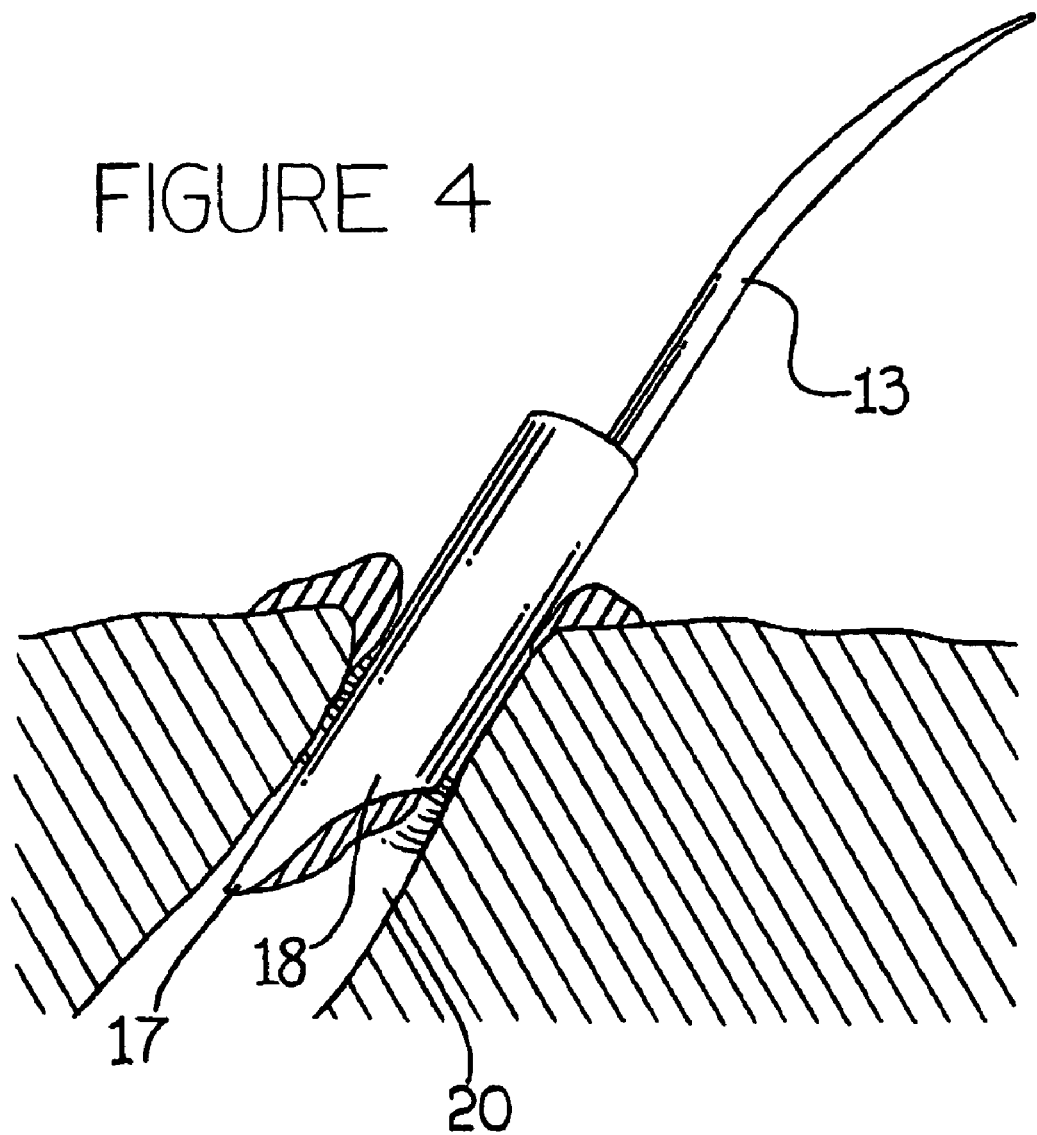

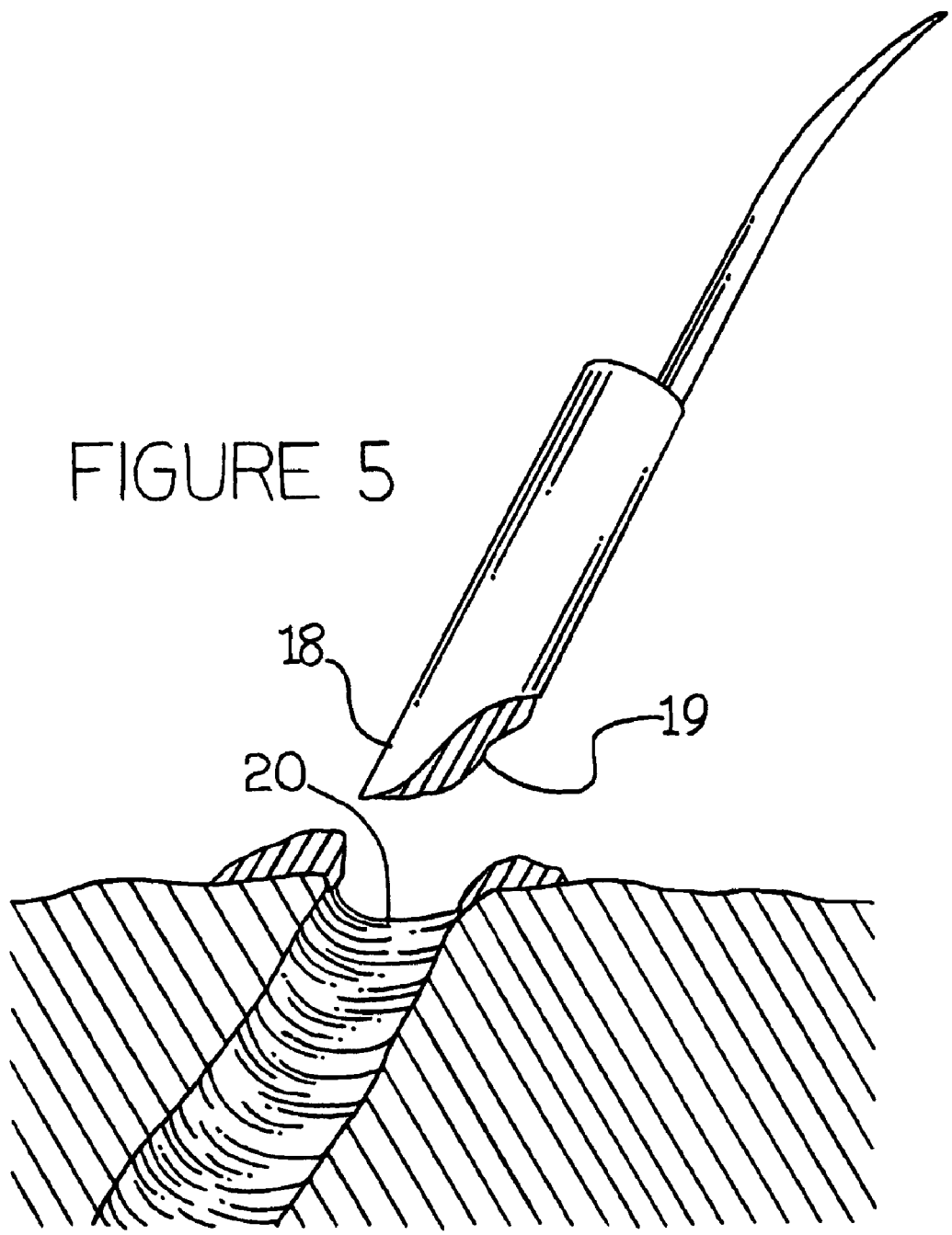

TOOL TO REMOVE SOIL OBSTRUCTING THE ENTRANCES TO GOPHER AND MOLE BURROWS

CROSS-REFERENCE TO RELATED APPLICATION

This application claims the benefit of Provisional Patent Application Ser. No. 60/473,521 filed 2003 May 28.

FEDERALLY SPONSORED RESEARCH

Not applicable

SEQUENCE LISTING

Not applicable

BACKGROUND OF THE INVENTION—FIELD OF INVENTION

The present invention relates to the field of pest control in general and in particular is a tool to locate and open rodent burrows such as those produced by gophers and moles, without damaging the burrow system.

BACKGROUND OF THE INVENTION

Homeowners, landscape professionals, and pest management professionals who desire to exterminate gophers and moles have various products available to them in the form of numerous traps and poisons. All such products must be placed carefully and deeply into the tunnel system with a minimum of disturbance to the tunnel in order to be safe to non-target species and effective as a means of exterminating the rodent.

Since gophers and moles seal the entrances to their burrows with soil plugs and large mounds of dirt, it is often difficult to locate the exact position of the burrow as regards to its depth, curve, and angle of descent. The process of locating the burrow must be done in such a manner as to leave the surrounding soil intact so that the tunnel does not collapse. Once the burrow has been located it must be opened to admit the preferred trap or poison and then resealed. Improper placement of the trap or poison will result in failure to exterminate the targeted pest and presents a danger to humans and pets.

There are a number of patents that are relevant to my invention. The prior art consists of various devices which penetrate the ground, remove soil plugs, or dispense rodenticides. Of these inventions, the majority bear no relation to pest control but are, rather, types of gardening devices for the purpose or planting, (see U.S. Pat. No. 1,572,431 to Hansen (1922)and U.K. patent GB 2 199 472 A to Pickering (1988)), weeding, (see U.S. Pat. No. 2,809,067 to Macchi (1957) and U.S. Pat. No. 2,427,369 to Ruple (19147)), lawn plugging, (see U.S. Pat. No. 3,927,720 to Rauch (1975)) and applying lawn care products, (see U.S. Pat. No. 6,047,650 to Taddei (2000)).

Various types of probes have been proposed that also bear no relation to pest control. For example, in U.S. patent Des. 269,844 to Hackerson (1983), the invention is a device for extracting soil cores for laboratory analysis and in U.S. Pat. No. 3,722,604 to Lesher (1973) the invention is a device for locating buried matter such as pipeline.

The prior art that does relate to pest control, specifically gopher control, differs significantly from this invention in form and function. In U.S. Pat. No. 1,558,426 to Barnes (1925) the invention is a baiting device which would be employed after the rodent burrow had been located and opened. This device is used to push poison down into an already accessible tunnel and deposit it there. In U.S. Pat. No. 2,539,271 to Rianda (1951) the invention is a T-shaped gopher probe with a removable rod that allows the operator to first puncture a hole through the roof of a gopher burrow, withdraw the rod, and then insert poison bait through the hollow sleeve into the tunnel. This device requires the user to be experienced in the skill of "reading" the burrow system in order to discern the most likely location of the burrow in relation to the mounds of dirt. This method may require numerous attempts by the user to successfully locate a burrow. If the soil is very hard, the probe will not be able to penetrate the ground and if the soil is loose, the burrow may collapse. Also, deeper burrows will be inaccessible by this method as they will be out of reach. Finally, in U.S. Pat. No. 4,413,440 to Schultz (1983), the invention is a combination gopher probe and poison dispenser which is described as an upstanding, hollow, tubular probe for the purpose of piercing the ground until the gopher tunnel has been located. A reservoir at the top of the device holds poison grain which flows down the tube and into the burrow when the user opens a valve. This type of device is subject to similar constraints as the aforementioned device. Several attempts will often be required to locate the burrow. These efforts will be hampered by conditions such as heavy, hard-packed soil, loose soil, and deep burrows. Inexperienced users will often misplace the bait. Also, this device is dependent upon the use of a fluent poison material. This restricts the types of poisons that will work with this device since only a very few types of rodenticides will flow without getting clogged in the device. Even when using the correct type of bait, these devices are subject to clogging when dirt cakes around the aperture near the tip of the probe where the poison grain is supposed to flow out.

The prior art fails to give homeowners and pest control professionals a small, light-weight hand tool that accesses rodent burrows at the burrow's natural entrance and completely removes the soil plug placed at the mouth of the burrow by the gopher or mole.

BACKGROUND OF INVENTION—OBJECTS AND ADVANTAGES

The invention is not hindered by soil conditions or the depth of the burrow and it can be used effectively even by inexperienced operators. This invention utilizes the natural entrance to the rodent burrow avoiding damage to and collapse of the burrow system. This is the key to proper placement of rodent control products. The invention places no restrictions upon the type of trap or rodenticide that may be used in conjunction with it. The invention itself is small, light-weight, and easy to use.

Homeowners, lawn care professionals, and pest control professionals are frequently frustrated by their failure to locate and open rodent burrow systems quickly and easily so that rodenticides or traps may be placed in the burrows. The previously cited inventions are bulky and require the user to poke around in the soil until the probe penetrates through the roof of the tunnel, often collapsing soil into the tunnel. Since successful rodenticide and trap placement requires that the burrow system remains intact, there exists a long-standing need for a new and improved method for locating and exposing rodent burrows.

SUMMARY

The invention is a probe for use in the field of pest extermination. It is a double-ended hand tool used to locate and then open gopher burrows so that rodenticides or traps can be placed inside the burrow quickly and easily with a minimum of disturbance to the burrow system. The curved probing element at one of the invention approximates the curve of the burrow itself, thus allowing the user to penetrate the soil plug at the entrance of the burrow and indicating to the user the exact direction that the burrow takes.

Once the user knows the location and direction of the burrow, the tool is pulled out and flipped over to position the opposite end of the tool at the burrow entrance. This end of the invention consists of a hollow tube with a beveled tip. The circumference of the tube approximates the circumference of a gopher or mole burrow so that the tube can be easily inserted into the natural entrance to the mouth of the burrow. The user inserts the hollow tube several inches into the mouth of the burrow, following the direction determined earlier. This action forces the soil plug into the lumen where it becomes lodged in the tube. The tube is then retracted from the burrow, taking the soil plug with it. The burrow is left clean, open, and undamaged. The soil plug engaged within the tool can be removed with a flick-of-the-wrist or by tapping the tool on the ground.

DRAWINGS—FIGURES

These and other attributes of the invention will become more clear upon a thorough study of the following description of the best mode for carrying out the invention, particularly when viewed in conjunction with the drawings wherein.

FIG. 3 is a view of the invention in operative association with a plugged gopher burrow system demonstrating the initial probing action of the invention.

FIG. 4 is a view of the invention in operative association with a plugged gopher tunnel system as it relates to the secondary digging and plug-removing action of the invention.

FIG. 5 is a view of the gopher tunnel being opened by the invention.

Figure 1:
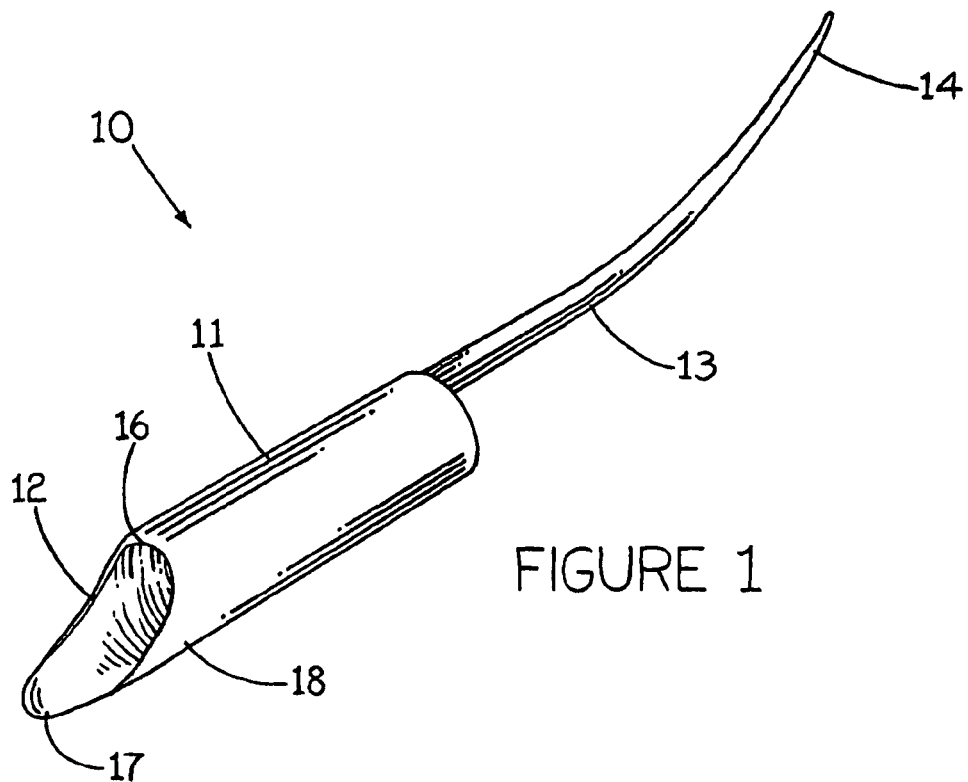
FIG. 1 is an isometric view of the invention.

| DRAWINGS-REFERENCE NUMERALS | |
|---|---|
| 10 | invention |
| 11 | main body |
| 12 | beveled tip |
| 13 | curved probing element |
| 14 | pointed tip |
| 15 | weld |
| 16 | lumen |
| 17 | scoop |
| 18 | plug extractor |
| 19 | soil plug |
| 20 | rodent tunnel |

DETAILED DESCRIPTION AND OPERATION— FIGS. 1–5—PREFERRED EMBODIMENT

Figure 2:
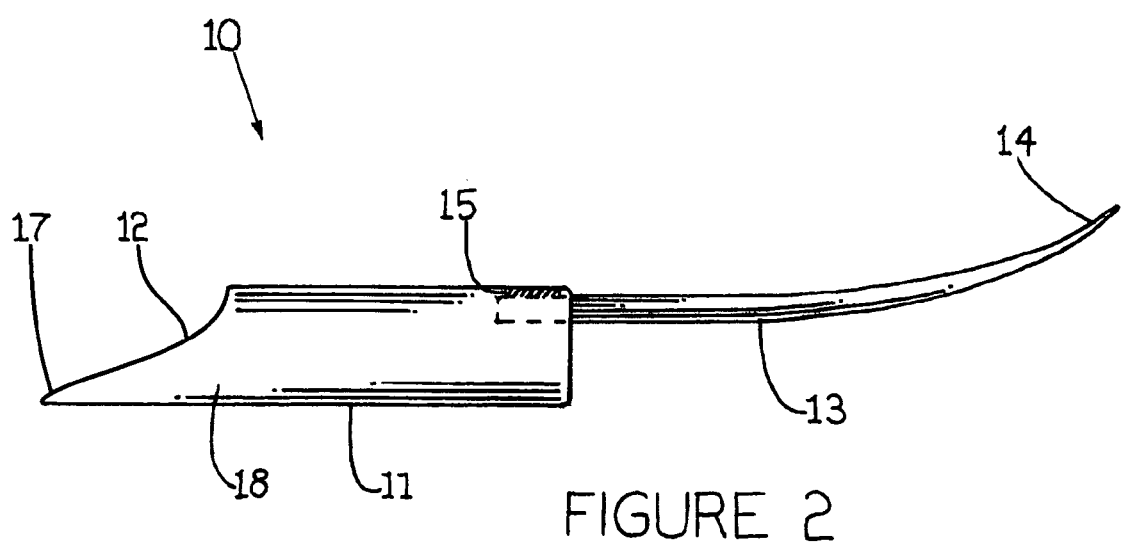
FIG. 2 is a side view of the invention.

FIG. 1 is an isometric view of the invention. The main body 11 of the invention 10 is comprised of a section of hollow metal tubing, having a portion of one end cut away at an angled curve thereby forming a beveled tip 12 effectively creating a scooped end 17 to aid in the insertion of the plug extractor 18. The circumference of the lumen 16 approximates the circumference of the tunnel 20. The other end of the invention 10 has an elongated, metal, curved probing element 13 attached to the main body 11 by a weld 15 (FIG. 2). The curve of the probing element 13 approximates the curve of a rodent tunnel 20. The distal tip 14 of the curved probing element 13 has been honed to a point 14 to facilitate probing through the soil plug 19 in order to locate the position of the tunnel 20. In order to gain access to a gopher tunnel, the user grips the tool by the main body 11 with the curved probing element 13 pointing away from the user. The user then inserts the pointed tip 14 into the soil plug 19 adjusting the angle and direction until the probing element 13 penetrates the soil plug 19 and drops into the tunnel 20 (FIG. 3). Once the user has determined the angle and direction of the tunnel 20 the tool is retracted and flipped over so the user is now gripping the probing element 13 and the plug extractor 18 is pointing away from the user. The user then inserts the scoop 17 into the tunnel 20 along the predetermined angle and direction (FIG. 4). The embrasure 12 facilitates the insertion of the hollow tube 11 so that the soil plug 19 becomes lodged in the plug extractor 18. When the invention is retracted (FIG. 5), the soil plug is removed from the tunnel with it, leaving the tunnel system open and intact.

CONCLUSION, RAMIFICATIONS, AND SCOPE

Thus the reader will see that the hand tool of the invention provides a highly reliable, lightweight, and economical device that can be used by persons of varying degrees of technical skill, allowing homeowners and professionals alike a fast and convenient way to apply the pest control products that are available for rodent control. This will allow the user greater safety and success since the pest control product will be placed properly underground away from non-target species and deeper into the burrow system where the rodent has a greater chance of contacting the product.

Although only an exemplary embodiment of the invention has been described in detail above, those skilled in the art will readily appreciate that certain modifications are possible without materially departing from the novel teachings and advantages of this invention. For example, minor changes such as increasing or decreasing the size of the probing element and main body or adjusting the curve of the probing element or the angle of the scoop are possible modifications. The invention could also be cast as a complete unit which would eliminate the need for a weld. Similarly, the invention could be constructed from a sturdy non-metallic material or coated with a protective finish, etc. Accordingly, all such modifications are intended to be included within the scope of this invention.

I claim:

1. A dual-ended hand tool, generally linear in form comprising:
   a single probing element shaped to enter a gopher or mole burrow,
   said probing element having a first proximal end and a second distal end,
   said second distal end of said probing element terminating in a single pointed tip to pierce through a loose plug of soil that gophers and moles use to stop up the entrances to their burrows, and a continuous length of thin-walled, hollow tubing, wherein said tubing having a diameter approximating the diameter of a gopher or mole burrow, said tubing having a first proximal end and a second distal end, said first proximal end of said tubing being directly joined to and extending from said first proximal end of said probing element, said second distal end of said tubing terminating in a beveled tip forming an elliptically shaped outer peripheral edge so as to be able to remove a loose plug of soil from said entrance of said gopher or mole burrow, said tubing having a generally hollow cylindrical shape defining a central axis extending along and through the center of said tubing, and said probing element being curved such that said second distal end of said probing element extends at an oblique angle from said central axis, such that said probing element can probe the length and horizontal direction of a burrow with a minimum of disturbance to a burrow system.

2. The tool of claim 1, wherein said second end of said tubing comprises a sharply angled end.

* * * * *